A. L. SCHULTZ.
TURNSTILE.
APPLICATION FILED APR. 1, 1916.
1,307,932.
Patented June 24, 1919.
3 SHEETS—SHEET 1.
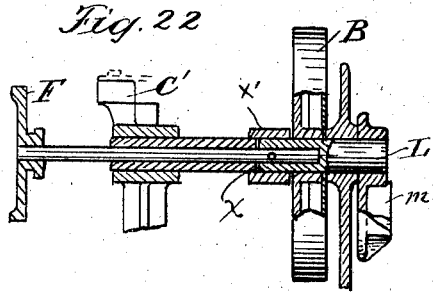
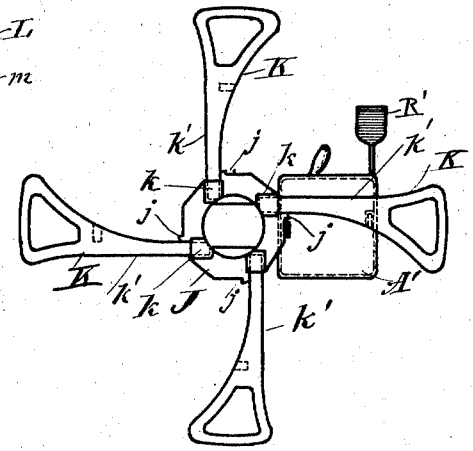
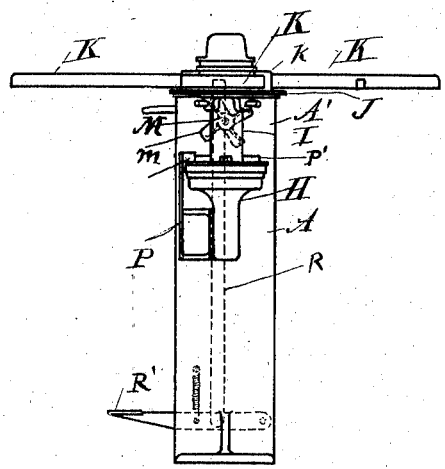
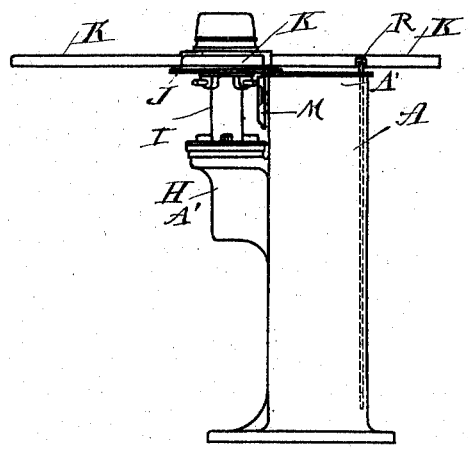
INVENTOR
August L. Schultz
BY
ATTORNEY A. L. SCHULTZ.
TURNSTILE.
APPLICATION FILED APR. 1, 1916.
1,307,932.
Patented June 24, 1919.
3 SHEETS—SHEET 2.
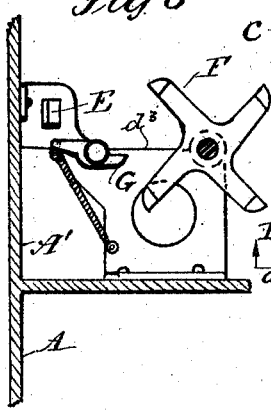
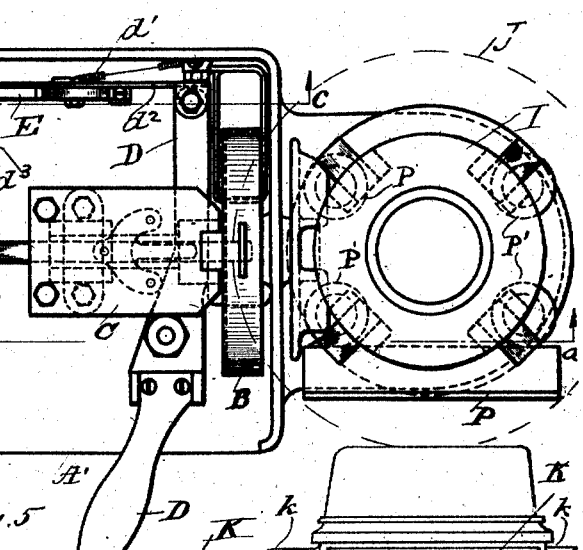
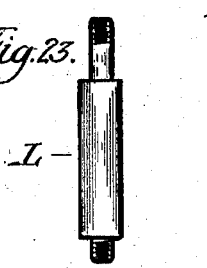
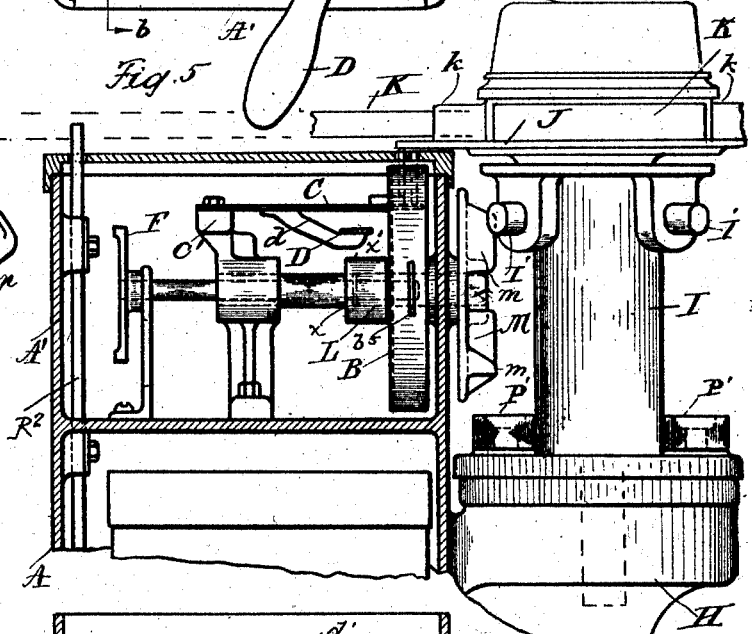
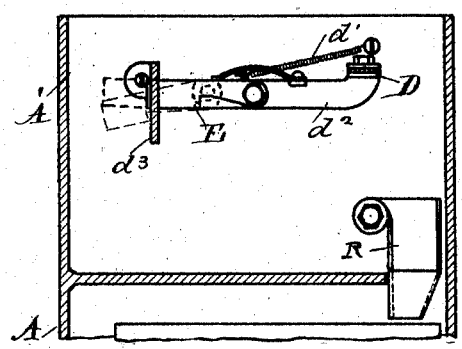
INVENTOR
August L. Schultz
BY Wm M Thowne
ATTORNEY A. L. SCHULTZ.
TURNSTILE.
APPLICATION FILED APR. 1, 1916.
1,307,932.
Patented June 24, 1919.
3 SHEETS—SHEET 3.
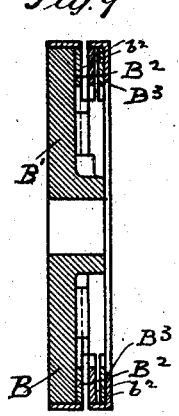
Fig. 9
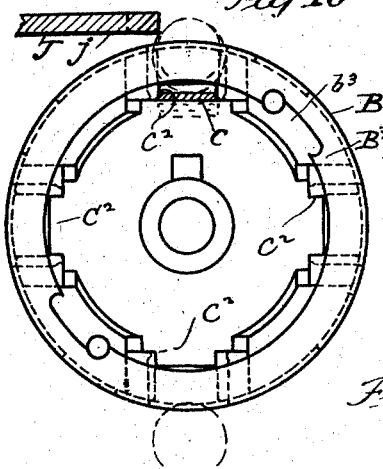
Fig. 10
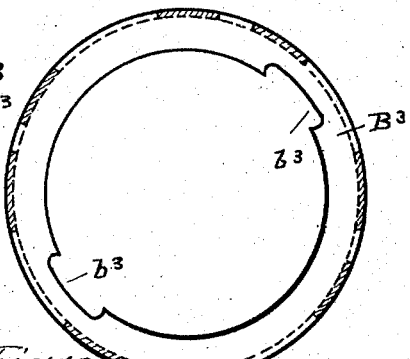
Fig. 11
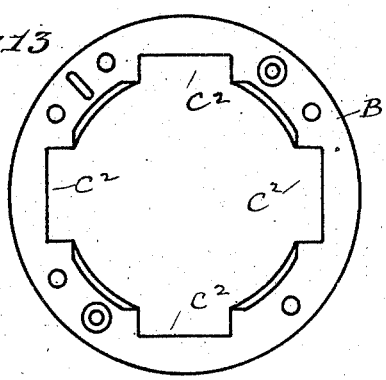
Fig. 13
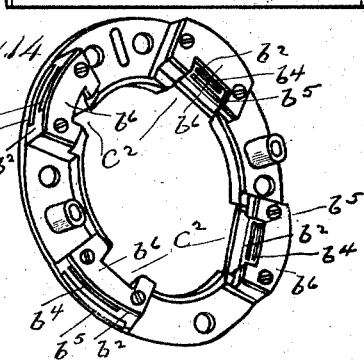
Fig. 14
Fig. 12
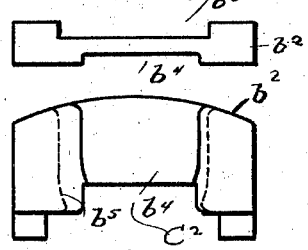
Fig. 17
Fig. 18
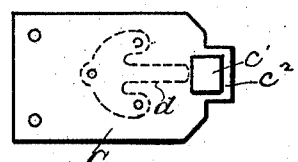
Fig. 15
Fig. 19
Fig. 16
Fig. 20
Fig. 21
INVENTOR
August L. Schultz
BY
[signature]
ATTORNEY

UNITED STATES PATENT OFFICE.

AUGUST L. SCHULTZ, OF CLEVELAND, OHIO.

TURNSTILE.

1,307,932.  Specification of Letters Patent.  Patented June 24, 1919.

Application filed April 1, 1916. Serial No. 88,195.

*To all whom it may concern:*

Be it known that I, AUGUST L. SCHULTZ, a citizen of the United States, and resident of Cleveland, in the county of Cuyahoga and State of Ohio, have invented certain new and useful Improvements in Turnstiles, of which I hereby declare the following to be a full, clear, and exact description, such as will enable others skilled in the art to which it appertains to make and use the same.

The objects of the invention are to provide an automatically acting registering turn stile, which is coin controlled, and in which the coin is always visible to the depositor and to the custodian, so that if the coin is defective or of the wrong denomination it can be removed before it falls into the operating parts of the machine.

The machine is also automatically locking in position and self stopping.

The machine is capable of use in the following several ways,

First, automatically registering with a coin and without a coin,

Second, by manually tripping the coin receiver to permit depositing the coin without admitting the depositor and without registering.

The invention includes a rotatable pressure plate or head to which the arms of the turn stile are detachably attached, and which operates the coin to release mechanism of the machine, and also means for stopping the rotating head to present each arm in turn transversely across the path, and for locking the same in position.

It includes a rotatable coin holder and a locking device therefor which retains the coin in position to be engaged and depressed by the pressure plate at periods corresponding to relative positions of the arms when directed across the passage so that the action of turning each arm will depress the coin and the locking device so as to release the pressure plate and permit the same to be turned.

The invention includes a compact form of standard or frame for the device permitting the operator to stand close to the machine and to the passer so that his every movement can be observed.

It includes a spring locking device for the rotatable coin holder releasable by the action of the coin, and also a hand lever by means of which the locking device can be manually released when the passer pays admission with a ticket or partially pays with a coin of too small a denomination to operate the locking device and when the balance of the fee is paid into the hand of the operator. In this case the machine will register and the passer is not interrupted.

By means of this hand lever the arms are turned only after the full fee has been paid.

In this operation the coin is visible to both operator and passer.

It includes a locking pawl operatively connected with the hand lever and designed to hold back the lever so as to permit of rotation of the coin holder by the operator without rotating the pressure plate or registering when the passer puts in a coin that is too low in denomination to operate the machine. By rotating the coin holder the coin is retained and deposited in a coin receptacle but the admission is not opened to the passer or registry made.

In the same manner when a defective coin will not pass through the coin holder the machine will not be stalled but the coin returns to the starting point and can easily be removed without operating the register.

It includes a separate pedal-operated locking device for retaining the pressure plate to be used in the above emergency.

It includes a revoluble coin holder provided with a detachable and interchangeable casing in which are spaced series of coin receiving openings.

It includes a locking spring upon which each coin in turn rests and which is depressed by the revolving pressure plate to which the arms are attached.

It includes lever operated pawl mechanism for retaining the locking spring out of its locking position and an automatically acting tripping mechanism for releasing the locking spring.

It includes the additional features of novelty and improvement hereinafter described, illustrated in the drawings and specifically pointed out in the claims.

In the accompanying drawings Figure 1 is a plan of the device; Fig. 2 is a side elevation thereof; Fig. 3 is an end elevation thereof; Fig. 4 is a plan thereof with the pressure plate and top of casing removed to show mechanism; Fig. 5 is a vertical section on line a—a Fig. 4; Fig. 6 is a vertical section on line b, b, Fig. 4; Fig. 7 is a vertical section on line c—c Fig. 4; Fig. 8 is a face view of the actuating wheel for the shaft on which the revolving coin holder is mounted; Fig. 9 is a vertical transverse section through the coin holder; Fig. 10 is a face view thereof; Fig. 11 is a face view of outer detachable plate which is rotatable to bring selected coin slots into registry; Fig. 12 is a side view of the same; Fig. 13 is a face view of back plate; Fig. 14 is a perspective view of the removable portion containing the respective coin slots and radial recesses into which the extremity of the locking spring is inserted to prevent movement of the coin holder and thereby of the turn stile; Fig. 15 is a plan view of the locking spring; Fig. 16 is an edge view thereof; Figs. 17, 18, and 19 are edge view, plan and end view respectively, of the detachable coin holding block forming a portion of the revolving coin holders; Figs. 20 and 21 are face and edge views respectively of the cover plate therefor; Fig. 22 is a longitudinal section showing the parted shaft of the coin holder. Fig. 23 is a detail of the coin holder shaft.

In these views A represents the frame of the machine, and is provided with a casing A' in which are positioned the revolving coin holder B and locking spring C; also in this case are positioned the operating lever D for releasing the spring C, the pivoted latch E operated by the lever and the releasing and tripping wheel F and dog G respectively. These parts are employed when operating the coin holder by hand.

Exterior to the casing is attached a bracket H upon which the vertical sleeve I and pressure head J are rotatably mounted.

The arms K, K, are detachably secured in sockets k, k, upon the pressure head which are preferably set so that the arms are offset from the center of the plate, thus bringing the engaged edge $k'$, $k'$ nearer to the operator of the machine.

The coin holding device B is disk shaped and is mounted upon the short shaft L which extends through the casing and upon which is mounted the disk M provided with as many arms m, m, as there are arms upon the turn stile. These arms m, m, are engaged in turn, as the pressure head J revolves by the radially projecting pins I', I', upon the sleeve I and are revolved thereby.

The coin holder B is normally locked to prevent movement thereof by means of the spring C or coin retaining member secured to a standard C' in the casing, the end of which engages in turn with the radial slots $C^2$ in the coin holder.

The coin rests upon the end of this spring and as the pressure plate J revolves, the coin is depressed by one of the projecting shoulders $j$, $j$, thereon and forces the spring out of engagement with the coin holder which is then forced to revolve and permits the pressure plate to revolve.

The pressure plate rides over the coin and coin slot and covers the slot so that it is impossible to insert another coin until the machine is automatically locked and another opening exposed to receive another coin.

The coin holder revolves until the coin slides by gravity into a receptacle $R^2$ provided for it and the spring engages the next retaining slot C' in the coin holder and locks the machine until another coin is deposited.

In Fig. 10 this action is seen,—the locking spring C being shown in section. The coin holder includes the disk shaped plate B', detachable coin holding portions $b^2$, and an adjustable front plate $B^3$. All parts are bolted together.

The coin holding portion $b^2$ is provided with two series of slots $b^4$, $b^5$, one series for large coins and one for smaller coins, the smaller slots covered by cover plates $b^6$, $b^6$.

The outer plate or ring $B^3$ is circumferentially slotted at $b^3$ to permit limited rotation thereof upon the body B and the detachable plate $B^2$ contains the coin holders $b^2$ having corresponding series of coin slots $b^4$, $b^5$, therein, and circumferentially spaced apart so that they can be alternately brought into line with the corresponding series of coin slots in the outer flanged plate $B^3$, and the other openings will be closed.

In Figs. 17, 18, 19, 20 and 21 the coin holding blocks $b^2$ and cover $b^6$ are shown detached.

In this manner the machine can be alternately used with coins of two denominations, which rest upon shoulders $c'$, $c^2$ arranged at different levels to adapt them to engage coins of different diameters upon the spring C respectively, to bring the upper edges of each coin to the same level when the pressure plate will depress them alike.

The parts are detachable also so that other combinations can be assembled if desired. To permit this action the shaft L upon which the coin holder is mounted is divided at X and a sleeve X' is used to connect the parts which can be separated to permit taking out the coin holder. Then another coin holder adapted to catch coins of other denominations can be substituted therefor.

The turn stile is automatically stopped with each arm in turn across the passage by means of the heavy spring P which engages two rollers P', P' at a time, as the pressure plate revolves. This stops the plate and arms at the right moment so that when the plate begins to revolve it will be in position to depress the coin and release the coin holder. The coin holder B can be revolved by hand without revolving the turn stile (arms and plate) by first releasing the locking spring therefrom. This is accomplished by means of the pivoted lever D having a detachable handle. This lever when thrown to the right engages an incline $d$ upon the spring C and depresses it. A spring $d'$ returns the lever. A latch E pivoted upon a portion $d^2$ of the lever engages a bar $d^3$ when the lever is thrown, and a tripping wheel F pivoted upon this bar automatically raises the latch by tripping a rotatable dog G when the arms $m$, $m$, of the wheel M upon the shaft of the coin holder are engaged by the pins I', I', as the arms of the stile are rotated, thus releasing the lever and locking spring, which returns into engagement with one of the radial slots in the coin holder.

When it is desired to run the turn stile freely without depositing coins, the lever can be locked in any convenient way as by a wedge in such a position as to prevent the return spring from operating. Also a vertical rod R can be raised by means of a pedal R' to prevent the arms from turning whenever desired.

When it is not desired to use the handle it can be removed to prevent outsiders from tampering with the machine.

When the locking spring is withdrawn from the coin holder, the coin holder can be revolved by hand to release a bent or defective coin, or to admit a passer who pays in some other way, as by a ticket, or if he pays in coins too small to operate the machine. If he deposits a coin too small to operate the machine the coin will be retained but the arms cannot be turned until the rod R has been released by the operator after the remainder of the fees has been paid.

Having described the invention what I claim as new and desire to secure by Letters Patent is:

1. In combination, in a turn stile, a frame, a pressure plate rotatable thereon, spaced arms extending horizontally therefrom, a coin holder provided with spaced coin receiving openings and rotatable in said frame, a locking device for said coin holder, said pressure plate engaging and operating to depress the coin in said coin holder and thereby to release said locking device from said coin holder, and means for rotating said coin holder when released.

2. In combination, in a turn stile, a frame, a pressure plate rotatable thereon, spaced arms extending horizontally therefrom, a coin holder provided with spaced coin receiving openings and rotatable in said frame, a locking device for said coin holder, said pressure plate engaging and operating to depress the coin in said coin holder and thereby release said locking device from said coin holder, means for rotating said coin holder when released, and spaced members upon said pressure head for engaging said rotating means in turn.

3. In a turn stile, in combination, a frame, a pressure plate rotatable thereon, a coin holding disk rotatable in said frame, said disk provided with a series of coin receptacles, a spring locking device for said disk on which the coins in said disk rest in turn, said pressure plate adapted to depress said coins and spring locking device to release said disk, and engaging means upon said pressure head for rotating said disk after it is released.

4. In a turn stile, a rotatable disk provided with a series of radial coin receptacles, a spring locking means therefor, and a rotating means therefor, and means for releasing said locking means to permit of rotating the coin holder and a separable rotatable support for the coin holder permitting of the withdrawal and substitution of coin holders thereon.

5. In a turn stile, a frame, a pressure plate or head, arms attached thereto, a shaft rotatable in the frame, a coin holding disk thereon, a spring locking means for said coin holder, upon which each coin rests in turn, as it is deposited, in said coin holder, each coin being positioned in the path of the movement of said pressure plate and depressed thereby to release said locking device from said coin holder, and coöperating engaging means upon said shaft and pressure head whereby said disk is turned when released to discharge a coin in unison with the movements of said pressure plate.

6. In combination, a frame, a rotatable coin holder therein provided with spaced radial coin receiving openings, a locking spring engaging said coin holder, an individually operated releasing device for said spring, a restraining means for said releasing device, and a tripping device for said restraining means.

7. In combination, in a turn stile, a frame, a casing thereon, a disk shaped coin holder rotatably mounted in said casing, a retaining locking spring therefor upon which the coins rest in turn, a rotatable pressure member adapted to depress each coin deposited in said coin holder and release said locking spring therefrom, means actuated by said pressure head for rotating said coin holder, a manually operated lever for releasing said locking spring, a restraining latch therefor, and a tripping device for automatically releasing said latch and lever when said coin holder is rotated.

8. In a coin holder, a back portion, a disk shaped body portion, provided with independent circumferentially spaced series of radial coin receiving recesses, and a front plate having an annular member sleeved over said body, said annular member provided with corresponding spaced series of openings, said annular member being circumferentially adjustable to bring said spaced series of recesses alternately into line with selected spaced series of openings.

9. In a coin controlled turn stile, a rotatable pressure plate, a rotatable coin holder, a depressible locking device for said coin holder, said locking device constructed and arranged to support the coin in the path of said pressure plate, means for rotating said pressure plate to release said locking device, and subsequently acting means actuated by said pressure plate, for rotating said coin holder to deposit said coin.

10. In a coin controlled turn stile, a rotatable pressure plate, a rotatable coin holder, a depressible locking device for said coin holder, said locking device constructed and arranged to support the coin in the path of said pressure plate, means for rotating said pressure plate to release said locking device, and subsequently acting means actuated by said pressure plate for rotating said coin holder to deposit said coin, and a receiving chute for said coin.

11. In a coin controlled turn stile, a rotatable pressure plate, a rotatable coin holder having spaced coin receptacles in its periphery, a depressible locking device adapted to engage with and lock said coin holder in positions registering with said coin receptacles, said locking device adapted to support a coin in each position in turn in the path of said pressure plate, means for rotating said coin holder to depress said coin and thereby release said locking device and subsequently acting means controlled by the movements of said pressure plate for rotating said coin holder, the distance from one coin receptacle to another.

12. In a coin controlled turn stile, a rotatable pressure plate, a rotatable coin holder having spaced coin receptacles in its periphery, a depressible locking device adapted to engage with and lock said coin holder in positions registering with said coin receptacles, said locking device adapted to support a coin in each position in turn in the path of said pressure plate, means for rotating said coin holder to depress said coin, and thereby release said locking device and subsequently acting means controlled by the movements of said pressure plate for rotating said coin holder, the distance from one coin receptacle to another, means for locking said pressure plate from movement, and means for releasing said locking device from said coin holder to permit it to be operated manually.

13. The combination with a rotatable pressure member, of a coin holding device, a withdrawable retaining member for said coin holder on which coins are supported in the path of said pressure member, said retaining member having shoulders at different levels on which coins of different denominations rest, and means for operating said coin holder to discharge said coins therefrom.

14. In combination, a pressure member, a movable coin holder provided with coin receptacles, a locking member for said coin holder, said locking member having coin supporting surfaces arranged at different levels, and adapted to support coins of different denominations in the path of said pressure member, and means for moving said coin holder to discharge said coins when released from said locking member.

In testimony whereof, I hereunto set my hand this 9th day of March 1916.

AUGUST L. SCHULTZ.

In presence of—
RALPH W. JEREMIAH,
WM. M. MONROE.

Copies of this patent may be obtained for five cents each, by addressing the "Commissioner of Patents, Washington, D. C."